UNITED STATES PATENT OFFICE.

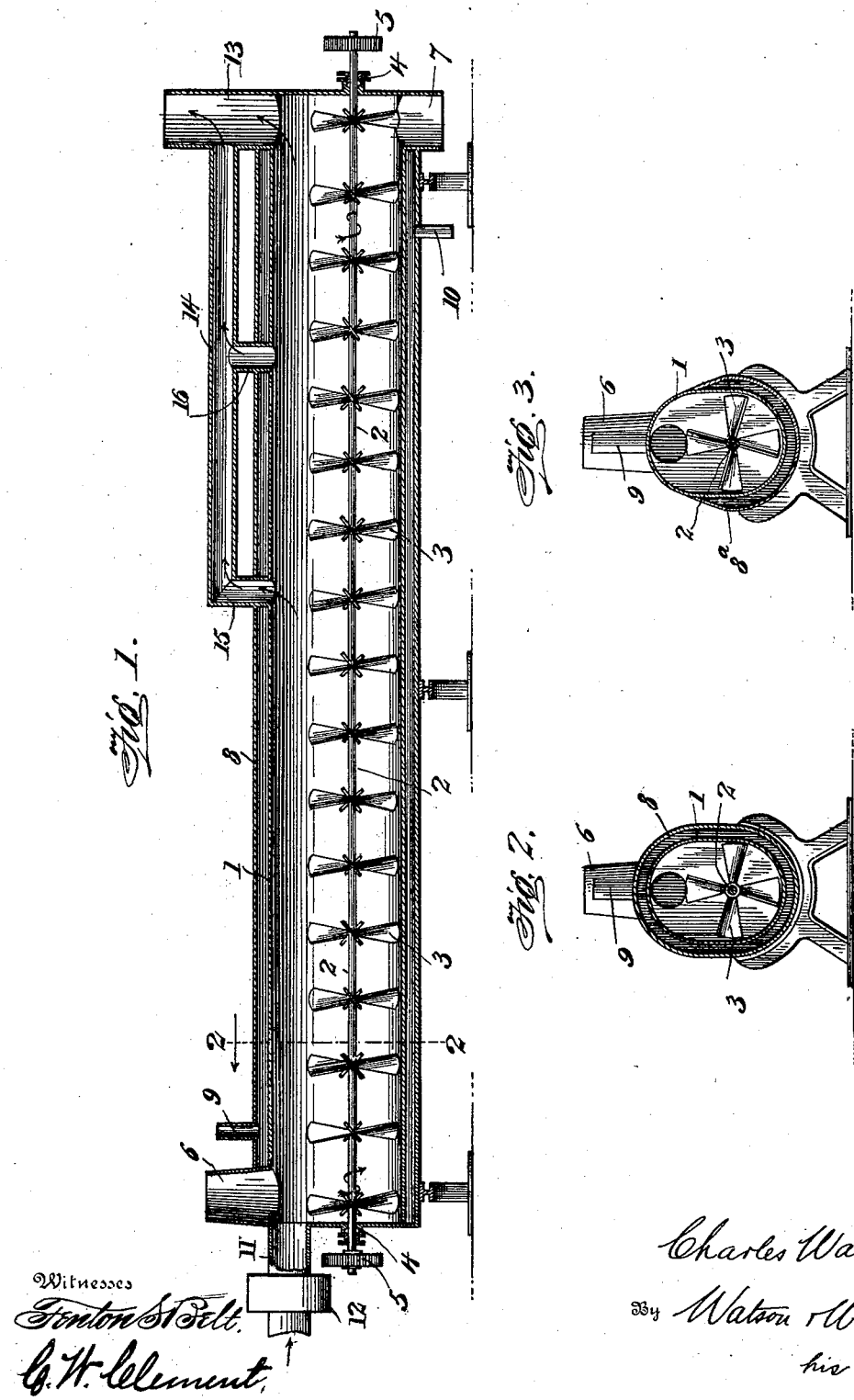

CHARLES WACKER, OF BALTIMORE, MARYLAND.

DRIER.

SPECIFICATION forming part of Letters Patent No. 676,165, dated June 11, 1901.

Application filed March 30, 1901. Serial No. 53,620. (No model.)

*To all whom it may concern:*

Be it known that I, CHARLES WACKER, a citizen of the United States, residing at Baltimore, in the State of Maryland, have invented certain new and useful Improvements in Driers, of which the following is a specification.

My invention relates to improvements in apparatus for drying fish-scrap, offal, and other material for the purpose of making fertilizers; and it includes means whereby the moist material is agitated in a draft of hot air, which absorbs the moisture without scorching the material, and the latter is then conveyed onward and subjected to a slower drying action as it parts with its moisture.

In the accompanying drawings, Figure 1 is a longitudinal central section through a drier made in accordance with my invention. Fig. 2 is a section on the line 2 2 of Fig. 1, and Fig. 3 is a similar section through a modified form of apparatus.

Referring to the drawings, 1 indicates a long cylinder or casing, preferably oblong in cross-section, as shown in Fig. 2, and having therein a rotatable shaft 2, upon which are mounted spirally-arranged beaters 3. This shaft, as shown, is mounted in suitable bearings 4 at the end of the casing and may be driven by means of the gear-wheels 5 or other suitable means. The shaft is arranged so that its blades or beaters 3 will run close to the bottom of the casing, leaving an unobstructed space above the blades for the passage of a hot-air current. A feed-chute 6 is arranged at one end of the casing and a discharge-chute 7 at the opposite end, and the blades upon the shaft are arranged to convey the material from the feed-chute to the discharge-chute. As shown, the feed-chute instead of flaring outwardly is in the form of an inverted funnel, so that material which is passed into it will not clog. The casing 1 is quite long and is surrounded throughout its entire length by a steam-jacket 8, having suitable steam inlet and outlet openings 9 and 10, respectively. At the forward end of the casing above the shaft is arranged an inlet-pipe 11, through which hot air is forced into the casing by means of a suitable blower 12. An outlet-pipe 13, leading to suitable dust-collectors, (not shown,) is arranged at the opposite end of the casing, and to this pipe is connected a pipe 14, having branches 15 and 16, which enter the casing at some distance from its discharge end. Hot air may of course be employed instead of steam in the jacketed space surrounding the casing.

In operation the material which is saturated with moisture is passed into the casing through the hopper 6 and hot air is forced into the casing by means of the blower 12. As the material contains a very large percentage of water when first introduced, it will not be scorched by the hot air; but when a considerable part of the moisture has been evaporated it is desirable to evaporate the remainder of the moisture by the application of a less degree of heat in order to prevent scorching. When the material enters the casing, it is agitated by the blades upon the shaft and thrown upward into the current of hot air, which passes along through the upper part of the casing. At the same time it is moved slowly toward the discharge end of the casing. The hot air rapidly absorbs the moisture from the material and the latter absorbs heat from the air. It will be evident that when the air has passed part way through the casing it will become cooler and saturated with moisture and will therefore lose its effectiveness. For this reason I connect the pipe 14 to the interior of the drier through the branch pipe 15 at a point where the air is cooled down to such an extent as to be of little further use as a drying agent, and the moisture which rises to the top of the casing is carried off through said pipe. After passing the point where the hot air has lost its effectiveness by the absorption of moisture and loss of heat the material is carried onward by the blades through the remaining portion of the casing, in which the drying operation is completed without danger of scorching by the heat supplied from the steam-jacket.

In hot-air driers where the air is supplied through a hollow shaft or at various points in the length of the drier the same degree of heat is maintained when the material is wet as when it has parted with the greater part of its moisture, and on that account it is frequently scorched. In other driers wherein the hot air is supplied at one end of the casing and drawn out at the other the hot air becomes laden with moisture and loses its effectiveness before reaching the discharge end of the drier, and consequently at said end the drying operation is not carried on. By means of my improvement the operation is continuous, and heat is applied in such a way as to prevent the possibility of the material being scorched.

In Fig. 3 I have shown a modification in which the steam or hot-air jacket 8ª extends only part way around the casing 1. This construction may be employed, if desired, although it is preferable to have the steam-jacket extend entirely around the casing, as shown in the other figures. The casing may be otherwise formed. It is necessary to construct it so that a suitable air-space will be provided above the blades of the shaft in order that the disintegrated material may be thrown up into this space and acted upon by the hot-air draft. This arrangement provides a comparatively free space for the air to pass through, and as the hot air enters and passes through the upper part of the casing it does not come in direct contact with the shaft and cause heating of the bearings. If desired, a suction-fan may be connected to the pipe 13.

While the drier is especially adapted for drying fish, offal, &c., for the purpose of making fertilizer, it is evident that it may be employed in an equally effective manner for drying various other substances for the same or other purposes.

Having described my invention, what I claim, and desire to secure by Letters Patent of the United States, is—

In a drier the combination with an elongated casing oblong in cross-section having a feed-opening at one end and a discharge-opening at the opposite end, of a shaft having blades thereon extending longitudinally through the lower part of the casing, means for admitting hot air to the upper part of the casing at the feed end, and an air and moisture outlet in the upper part of said casing between the feed and discharge ends, and means for externally heating the casing between said outlet and the discharge end of the casing.

In testimony whereof I affix my signature in presence of two witnesses.

CHARLES WACKER.

Witnesses:
LABAN W. EVANS,
CHAS. M. STRUVEN.